United States Patent [19]

Asbury et al.

[11] Patent Number: 4,917,770
[45] Date of Patent: Apr. 17, 1990

[54] DISTILLATION APPARATUS

[76] Inventors: Charles T. Asbury; Genevieve J. Asbury, both of 4710 61st Avenue Dr. West, Bradenton, Fla. 34210

[21] Appl. No.: 390,611

[22] Filed: Aug. 7, 1989

[51] Int. Cl.[4] .............. C02F 1/04; C02F 1/20
[52] U.S. Cl. .................. 202/176; 202/177; 202/180; 202/181; 202/193; 202/196; 202/206; 202/234; 202/236; 202/266; 202/270; 203/4; 203/10; 203/22; 203/39; 203/DIG. 17; 203/DIG. 22; 203/DIG. 25
[58] Field of Search ............... 203/10, 11, DIG. 17, 203/22, 39, 7, DIG. 22, DIG. 2, 89, 4, DIG. 25; 202/180, 181, 176, 192, 193, 195, 196, 177, 266, 270, 206, 83, 269, 236, 234

[56] References Cited

U.S. PATENT DOCUMENTS

| | | | |
|---|---|---|---|
| 1,145,497 | 7/1915 | Manahan | 202/180 |
| 1,440,199 | 12/1922 | Wissing | 202/181 |
| 1,635,112 | 7/1927 | Carlson et al. | 202/196 |
| 1,762,898 | 6/1930 | Sorensen | 202/196 |
| 1,867,076 | 7/1932 | Hughes et al. | 202/177 |
| 2,475,481 | 7/1949 | Clemens | 202/181 |
| 3,055,810 | 9/1962 | Skow | 202/193 |
| 3,088,882 | 5/1963 | Justice | 202/180 |
| 3,340,157 | 9/1967 | Weiss | 202/180 |
| 3,483,092 | 12/1969 | Young | 202/181 |
| 3,935,077 | 1/1976 | Dennison | 202/180 |
| 4,230,530 | 10/1980 | Lemoine | 202/180 |
| 4,342,625 | 8/1982 | Dennison | 202/193 |
| 4,415,075 | 11/1983 | McNesky et al. | 202/196 |
| 4,724,048 | 2/1988 | Helmich | 202/180 |

FOREIGN PATENT DOCUMENTS 1090282  11/1980  Canada .................. 202/180

Primary Examiner—Wilbur Bascomb
Attorney, Agent, or Firm—Charles J. Prescott; Raymond H. Quist

[57] ABSTRACT

A vertically extending distillation cylinder has a closed top and an open bottom having an electric heating element disposed therein to form a closure. Adjacent to the top of the distillation cylinder is connected a condensing tube. The condensing tube extends down through a condenser having a cooling water inlet at the bottom and a water discharge at the top. A throttle valve regulates the flow of cooling water. From the water discharge, a trough carries the water to impinge on the distillation cylinder causing pollutants to vaporize. The water collects below in a basin surrounding the distillation cylinder. A feed tube carries water from the basin to the bottom of the distillation cylinder. A discharge tube also connected to the bottom of the distillation cylinder carries water up to where it makes a U-turn. This regulates water height in the distillation cylinder. The discharge tube and an over flow tube from the basin discharge into a funnel from which water is conveyed to a sewer.

7 Claims, 1 Drawing Sheet

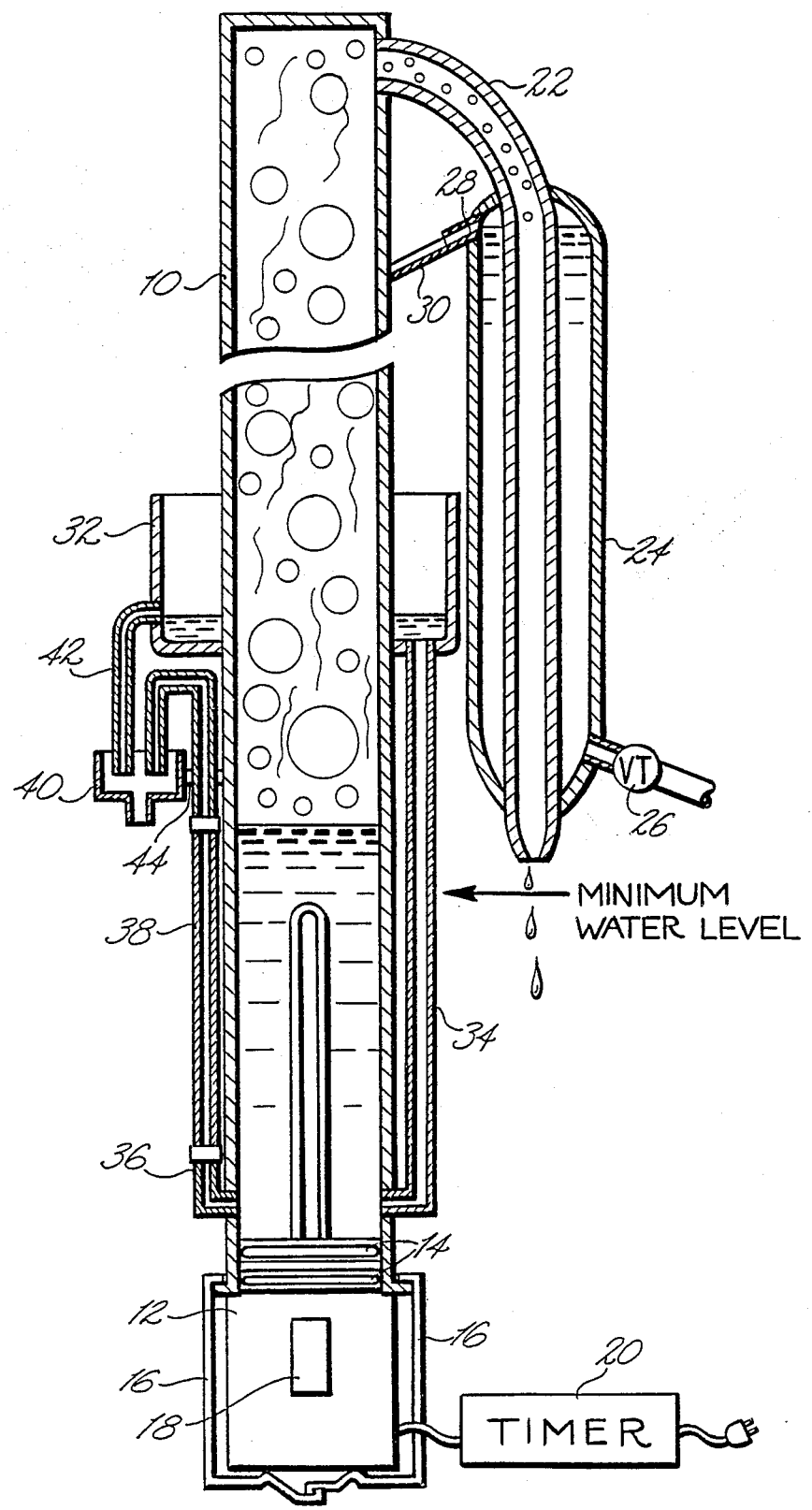

4,917,770

DISTILLATION APPARATUS

BACKGROUND OF THE INVENTION

1. Field of the Invention

This invention relates generally to distillation apparatus and more particularly to distillation apparatus suitable for distilling water at home.

2. Description of Related Art

Water supplied by municipalities typically includes chlorine -sometimes in high enough concentration to make the water distasteful. In addition, city water or water from other sources may contain quantities of noxious chemicals. Distillation, if properly performed, will remove most, if not all, such chemicals. Home distillation equipment has previously been patented.

U.S. Pat. No. 4,239,601, Lemoine, entitled "Water Distiller with Volatile Pollutants Removal Stage", discloses apparatus which purports to remove volatile pollutants.

U.S. Pat. No. 4,252,616, Glazer, entitled "Water Distillation Apparatus and Method", discloses distillation apparatus intended to avoid problems due to scale.

U.S. Pat. No. 4,339,307, Ellis, Jr., entitled "Distillation Apparatus", discloses distillation apparatus essentially contained in a single housing.

U.S. Pat. No. 4,415,075, McNesky et al., entitled "Wall Mounted Light Weight Automatic Water Distiller", discloses distillation apparatus incorporating a number of features for automatic operation.

The present distillation apparatus is directed toward reducing some of the complexities of prior apparatus, while performing distillation and removal of pollutants effectively.

SUMMARY OF THE INVENTION

An upwardly extending distillation cylinder has a heating element disposed at the base thereof. The lower portion of the cylinder contains water which is heated, while the upper portion contains heated water vapor. A condenser tube extends from the top of the cylinder down through the center of a condenser containing incoming cool water. The distillate flows from the bottom of the condenser tube. The flow of water to the condenser is controlled by a throttle valve to be at a desired amount. Cooling water which has passed through the condeser is preheated therein, and removed at an aperture near the top of the condenser. This water is fed into a trough which extends angularly downwardly so as to cause the water to impinge on the outer upper surface of the distillation cylinder. As this water flows down the distillation cylinder, pollutants are volatilized into the surrounding air. The water, which has been further heated during this passage, flows into a basin surrounding the distillation cylinder. A tube extending downwardly from the bottom of the basin carries water to the bottom of the distillation cylinder. A second tube extends up from the bottom of the distillation cylinder and makes a U-turn so that any discharge therefrom will fall into a collecting funnel. This tube may include a water gauge to assure that water will be at a desired level in the distillation cylinder. An overflow tube extends from the basin to discharge into the collecting funnel. The heating element closes the bottom of the distillation cylinder and has dual O-rings to provide a seal. Interlocking spring clips hold the heating unit in place so that it can be readily removed for cleaning when desired. A timer may be employed to shut off the heater if desired.

It is therefore an object of this invention to provide distillation apparatus for home use which is effective in removing pollutants from the water being distilled.

It is also an object of this invention to provide distillation apparatus which is uncomplicated and simple to operate.

In accordance with these and other objects, which will become apparent hereafter, the instant invention will now be described with reference to the accompanying drawings.

BRIEF DESCRIPTION OF THE DRAWING

The single FIGURE discloses distillation apparatus, partially in cross-section, in accordance with the invention.

DETAILED DESCRIPTION OF THE INVENTION

Referring to the drawing, distillation cylinder 10 of 304 stainless steel has heating element 12 disposed at the bottom. From experience, to prevent water damage in 301 stainless steel welds, all welds should be x-rayed for safety. Neoprene O-rings 14 contained in grooves about the heater element provide a water-tight seal with cylinder 10. Heating element 12 is removably secured in the base of cylinder 10 by interlocking spring clips 16. Heating element 12 preferably includes indicator light 18 which is lit while the heater is electrified. Timer 20 may be used to turn off heating element 12 after a predetermined time.

Near the closed top of distillation cylinder 10 is connected condenser tube 22. Heated water vapor from distillation cylinder 10 will flow into condenser tube 22. Condenser tube 22 passes through condenser 24 which receives cool water to be distilled through trottle valve 26. When sufficient water enters condenser 24 it will begin to discharge from aperture 28 onto trough 30. The water discharged from aperture 28 has been heated in condenser 24 by condensing and partially cooling the distillate. It should be observed that the water will impinge upon the outer surface of distillation cylinder 10. The water is sufficiently heated by this hot surface to volatilize and drive off into the surrounding air most if not all the pollutants contained in the water. There is adequate time for this to occur if distillation cylinder is made long enough. We have used a distillation cylinder approximately two inches in diameter and about forty inches long. The water does not travel this full length, but is collected in basin 32 which is about half way down. From the bottom of basin 32 extends feed tube 34 which is connected to distillation cylinder 10 adjacent to its base. When heater element 12 is not turned on, water will rise in distillation cylinder 10 to a level determined by the height of discharge tube 36. Discharge tube 36 may include transparent water gauge 38. Discharge tube 36 makes a U-turn at its highest point and then is directed into funnel 40. Over flow tube 42 which is connected to basin 32 also discharges into funnel 40. Funnel 40 is supported by bracket 44. Funnel 40 typically has its outlet connected to a sewer or the like.

It will be recognized that unless heater element 12 is removed, distillation tube 10 will already contain water. Therefore, heater element 12 can be turned on immediately. Throttle valve 26 is also opened. As hot water vapor is generated within distillation cylinder 10, a pressure increase is experienced which tends to force a spurt of water out of discharge tube 36. This spurt relieves some of the pressure and the discharge stops for a few moments. Then another spurt occurs. As long as this spurting continues, sufficient cool water is being supplied to the apparatus. If, however, a continuous flow discharges from tube 36, too much water is being supplied and flow should be decreased by closing throttle valve somewhat. When proper flow is established, the position of throttle valve 26 should be noted for future use.

If condensate is collected in a container, the time required to fill the container can be determined and timer 20 can thereafter be set to turn off heater element 12 so as to conserve electricity. Timer 20 may also provide a signal when it turns off so that water flow will be stopped.

The surging or spurting action of the distillation apparatus tends to cause precipitates in the water in distillation cylinder 10 to be carried out discharge tube 36. Frequent cleaning of the apparatus is therefore not necessary.

It should be noted that movement of water through the apparatus can be observed at several locations so that operation of the device can be monitored.

Although a more automatic operation of the apparatus of this invention would be possible, we believe the additional complications necessitated thereby are not commensurate with any benefits.

While the instant invention has been shown and described herein in what is conceived to be the most practical and preferred embodiment, it is recognized that departures may be made therefrom within the scope of the invention, which is therefore not to be limited to the details disclosed herein, but is to be afforded the full scope of the claims so as to embrace any and all equivalent apparatus and articles.

We claim:

1. Distillation apparatus comprising:
   a vertically extending distillation cylinder having a closed top and an open bottom;
   a heating element disposed in said distillation cylinder and having a base closing said bottom of said distillation cylinder;
   a condensing tube connected to said distillation cylinder adjacent to said top, whereby water vapor formed within said distillation cylinder will enter said condensing tube;
   a condenser having a top and a bottom enclosing a portion of said condensing tube;
   said condenser having a cooling water inlet adjacent to said bottom of said condenser;
   said condenser having a cooling water discharge aperture adjacent to said top of said condenser;
   a trough connected to said discharge aperture and extending downwardly and outwardly to a point where water in said trough will impinge on said distillation cylinder;
   a basin having a bottom and a side wall surrounding said distillation cylinder and secured thereto for collecting water which impinges on said distillation cylinder;
   an over flow tube having a first end above said bottom of said basin;
   said over flow tube extending downwardly to a second end;
   a feed tube having a first end connected to said basin and a second end connected to said distillation cylinder adjacent to said bottom of said distillation cylinder;
   an upwardly extending discharge tube having a first end connected to said distillation cylinder adjacent to said bottom of said distillation cylinder;
   said discharge tube having a U-turn and extending downwardly to a second end;
   a funnel disposed below said second end of said discharge tube and said second end of said over flow tube.

2. Distillation apparatus in accordance with claim 1 further including:
   a throttle valve operatively connected to said cooling water inlet of said condenser, whereby the flow of water to said condenser can be regulated.

3. Distillation apparatus in accordance with claim 1 further including:
   spring clips securing said base of said heating element to said distillation cylinder.

4. Distillation apparatus in accordance with claim 1 further including:
   an indicator light electrically connected to said heating element which is lit when said heating element is electrified.

5. Distillation apparatus in accordance with claim 1 wherein:
   said discharge tube includes a water gauge, whereby the level of water in said distillation cylinder can be determined.

6. Distillation apparatus in accordance with claim 1 wherein:
   said heating element has an electic wire adapted to be connected to a source of electrical power for supplying power thereto and a timer is operatively connected to said electric wire adapted to disconnect power thereto after a predetermined time.

7. Distillation apparatus in accordance with claim 1 wherein:
   at least one O-ring is disposed between said heating element base and said bottom of said distillation cylinder.

* * * * *